United States Patent [19]

Bond et al.

[11] Patent Number: 4,975,808
[45] Date of Patent: Dec. 4, 1990

[54] BACKLIGHTING APPARATUS

[75] Inventors: David L. Bond, Hoffman Estates; Kevin D. Kaschke, Schaumburg, both of Ill.

[73] Assignee: Motorola, Inc., Schaumburg, Ill.

[21] Appl. No.: 415,741

[22] Filed: Oct. 2, 1989

[51] Int. Cl.[5] ............................................. F21V 8/00
[52] U.S. Cl. ...................................... 362/31; 362/27
[58] Field of Search ............... 362/31, 26, 27, 327, 362/330, 339

[56] References Cited

U.S. PATENT DOCUMENTS

| | | | |
|---|---|---|---|
| 2,838,865 | 6/1958 | Hardesty | 362/31 |
| 3,450,870 | 6/1969 | Curl | 362/31 |
| 3,892,959 | 7/1975 | Pulles | 362/31 |
| 4,096,550 | 6/1978 | Boller | 362/31 |
| 4,229,783 | 10/1980 | Eberhardt | 362/352 |
| 4,247,928 | 1/1981 | Dorfman | 368/67 |
| 4,573,766 | 3/1986 | Bournay, Jr. | 350/345 |
| 4,729,067 | 3/1988 | Ohe | 362/31 |
| 4,735,495 | 4/1988 | Herkes | 350/345 |
| 4,755,035 | 7/1988 | Kopish et al. | 350/345 |
| 4,789,224 | 12/1988 | Bougsty | 350/345 |
| 4,909,604 | 3/1990 | Kobayashi et al. | 362/31 |

Primary Examiner—Ira S. Lazarus
Assistant Examiner—Richard R. Cole
Attorney, Agent, or Firm—Kenneth W. Bolvin

[57] ABSTRACT

Improved backlighting apparatus evenly illuminates positive and negative LCDs under all ambient lighting conditions. Incandescent lamps (301-304) provide light for distribution by a light pipe (101). The bottom of the light pipe (101) is selectively painted white to reflect light to the top of the light pipe (101) while the unpainted areas reflect light internal to the light pipe (101), controlling hot and dim spots. The corners of the light pipe (101) near the lamps (301-304) are dual angled to reflect the light into the center of the display. The burnout of a lamp (301-304) will not substantially affect the even lighting capabilities of the apparatus.

19 Claims, 2 Drawing Sheets

PAINTED WHITE NO GLOSSY BACK OF ACRYLIC LIGHT PIPE.

NO PAINT ONLY GLOSSY PIPE

BACKLIGHTING APPARATUS

FIELD OF THE INVENTION

This invention relates generally to backlighting. Specifically, this invention concerns the backlighting of liquid crystal displays.

Background Art

Two types of liquid crystal displays (LCD) in common use are positive and negative image displays. The positive image display allows the background to emit or reflect light while the segment area is dark. The segments block the light emitted or reflected only where the segments are darkened, thus forming the characters. The negative image display has a dark background while the open segmented area forms the characters by emitting or reflecting light. The background of a positive image LCD or the segments of a negative image LCD can be colored by using a filter with the incandescent bulbs or by changing the color of the LED lamps.

The LCD acts as a light shutter rather than a light emitting display requiring light behind the LCD to define which segments are turned on. This lighting of an LCD from behind is called backlighting.

Backlighting can be implemented using two techniques. The first technique is to place a reflector behind the LCD. The reflector casues the ambient light entering the top of the LCD to be reflected back through the LCD from behind. This is very effective in high ambient lighting conditions such as sunlight. The brigther the ambient light, the brigther the backlighting and, therefore, the more readable the LCD. In low ambient lighting conditions, such as at night or twilight, a reflector is not effective since there is not enought light entering the top of the LCD for backlighting.

The second backlighting technique uses an artificial light source behind the LCD. This technique is effective in low ambient lighting conditions. This technique does not function in high ambient lighting conditions since the high ambient light overpowers the artificial light. As a result, the LCD segments are either dim or completely unreadable. Artificial light sources may include: incandescent bulbs, light emitting diodes (LED), electrolumuniscent panels, fluorescent tubes or halogen bulbs.

Typically, a negative image display uses artificial backlighting to emit light in low ambient lighting conditions and also a diffuser sheet on top of the light pipe to reflect the ambient light in high ambient lighting conditions. If the backlighting is not bright enough, the display will look poor in average ambient lighting conditions. This is caused by the lack of enough ambient light to utilize the reflective properties of the diffuser and not enough artificial backlighting to overcome the average ambient light.

When the backlighting is combined with the LCD and the drive circuitry it is called a display module. Some display modules are so thin that there is limited space behind the LCD for the backlighting. Some display modules also have length and width restrictions. These small, low profile display modules require that the illumination sources be on the sides of a light pipe to provide the LCD backlighting.

Both negative image and positive image LCDs suffer from similar problems. These problems can include: uneven lighting, dim lighting and low lamp reliability. Uneven lighting is generally characterized by hot spots. The hot spot is a local area where the light is more intense than the other areas of the display. The hot spot is generally confined to the area surrounding the illumination source itself. For low profile displays with the illumination sources at the edge of the light pipe, the LCD usually has hot spots at its edge and is dim in its center.

The dim lighting problem occurs when the entire area of the display is at an unacceptable brightness. Backlighting a negative image display is more difficult than a positive image display. For a negative image display, the viewer only sees the light emitting from the segmented area rather than the entire background area as in a positive image LCD. Therefore, the quantity of the backlighting illumination must be great to produce an aesthetically pleasing display in average ambient lighting conditions. Because of the display module's size restrictions, typically incandescent bulbs or LEDs have been used. Incandescent bulbs would be the preferred choice for negative image, low profile display modules since they put out more light than LEDs. A disadvantage of incandescent bulbs is that they are inherently less reliable than LEDs.

The low reliability of the incandescent bulbs usually deters their use for backlighting the displays. The life expectancy of a lamp is inversely proportional to its efficiency. In other words, increasing an incandescent lamps efficiency decreases its life span. A high rated voltage also reduces the lamp's resistance to mechanical shock and vibration. Typically, therefore, a bright negative image LCD using incandescent backlighting has either a short life span or high power requirements and is susceptible to failure during mechanical shock and vibration.

There is therefore a need for a backlighting device that has even illumination, aesthetically pleasing brightness under all viewing conditions, and high reliability.

SUMMARY OF THE INVENTION

The present invention provides even and bright illumination for either a positive or negative image display. Using four incandescent lamps to provide illumination, a light pipe distributes the light by reflecting it off the side internal to the light pipe. Each corner of the light pipe is dual angled to reflect the light toward the center of the display. Light is diffused off the bottom of the light pipe, while controlling hot and dim spots, by painting the bottom white except near the edges and in a pattern around the lamps. Light refracted out of the sides of the light pipe is reflected back in by while diffusing reflectors on two sides of the light pipe and white elastomeric reflectors, that connect the underlying circuitry to the LCD, on the other two side.

The lamps are wired in two pairs, each pair connected in series. Each pair of lamps can adequately illuminate the entire display. With two series pairs illuminating the entire display, a lower voltage is applied to each lamp. The lower voltage translates into higher reliability for the lamps.

The optical efficiency of this invention allows the use of incandescent lamps that have acceptable life, power consumption and heat dissipation while still providing bright backlighting.

BEST MODE OF CARRYING OUT THE INVENTION

Figure 1:
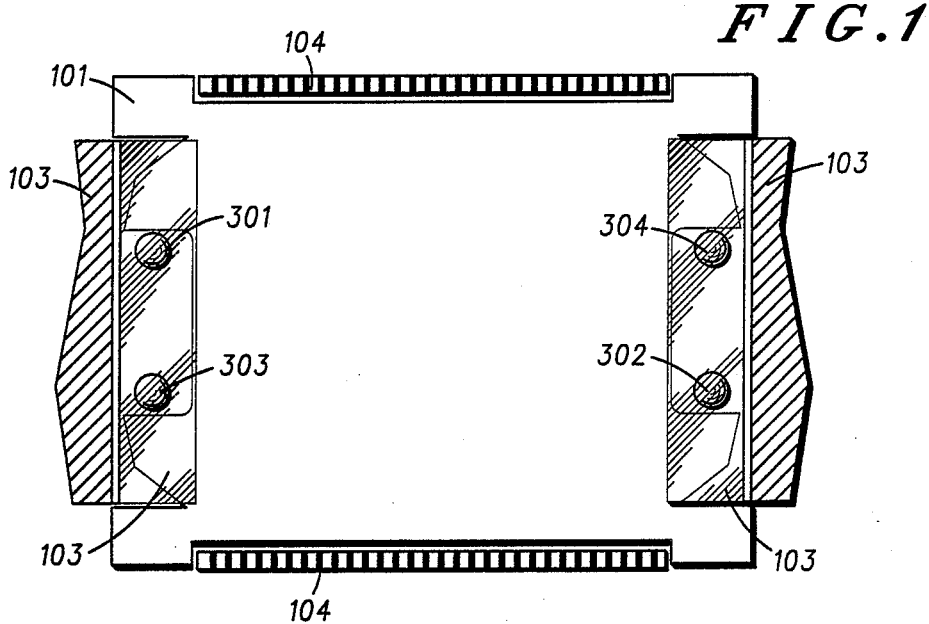
FIG. 1 shows a block diagram of the preferred embodiment in accordance with the present invention.
Figure 2:
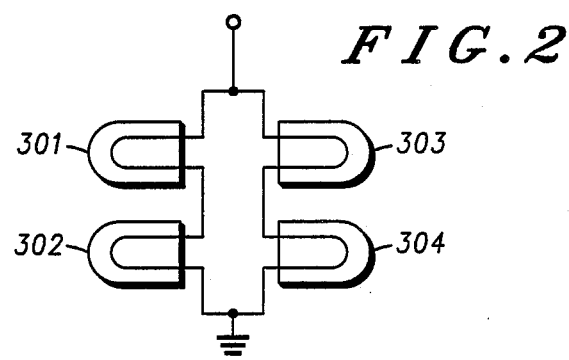
FIG. 2 shows the preferred embodiment of lamp connection in accordance with the present invention.

This invention provides an even distribution of bright light across a low profile liquid crystal display. The preferred embodiment of this invention, as illustrated in FIG. 1, is comprised of an acrylic light pipe (101), four incandescent lamps (301-304), two diffusing reflectors (103), and two elastomeric connecting strips (104). A bright, evenly lit display is achieved by coupling the light form lamps (301-304) into the light pipe (101). Light emitted from the end of the lamp is directed toward the center using internal reflection of the light pipe (101).

The four lamps (301-304) are positioned in pairs on opposing sides of the light pipe (101) and placed on their sides to maintain a narrow side profile for the apparatus. The lamps (301-304) are placed as closed to the light pipe (101) as possible to insure maximum luminous flux entering the light pipe (101) from the lamps (301-304). The lamp (301-304) bottoms are positioned close enough together to minimize the dim area between the lamps (301-304) at the edge of the light pipe (101).

Figure 3:
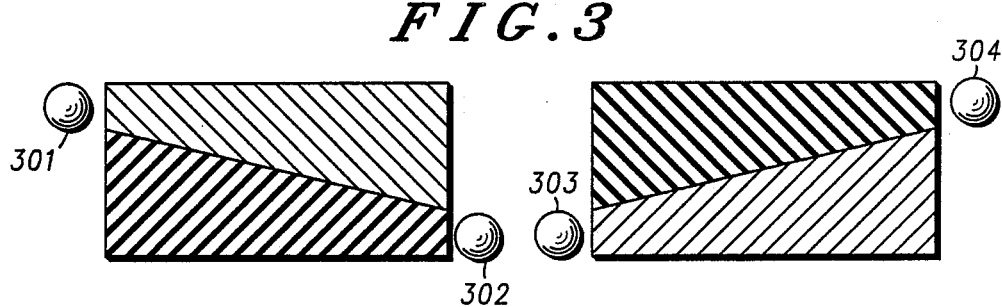
FIG. 3 shows the illumination pattern of the lamps in accordance with the present invention.

The lamps can be electrically connected in a diagonal series parallel configuration illustrated in FIG . 2. Either pair of series connected lamps (301-302,303-304) alone can adequately illuminate the entire display. The illumination pattern of each pair is illustrated in FIG. 3. A benefit of this configuration is that if one of the lamps (301-304) burns out, the other lamp (301-304) in series with it also goes out leaving the other two lamps (301-304) to adequately evenly light the display. The average brightness will only be half when operating with the two lamps (301-304) out, but the illumination will still be an adequately even distribution. Another benefit of this configuration is that each lamp (301-304) is operated at a lower voltage. The lower voltage makes the lamps (301-304) less susceptible to shock and gives them a longer life expectancy without increasing power consumption.

A white diffuse reflector is placed around the three sides of the lamps which do not face the light pipe. This reflector both the light from the adjacent lamps (301-303,302-304) into the light pipe and also light which has passed through the light pipe from the other lamps (301-303,302-304).

Figure 4:
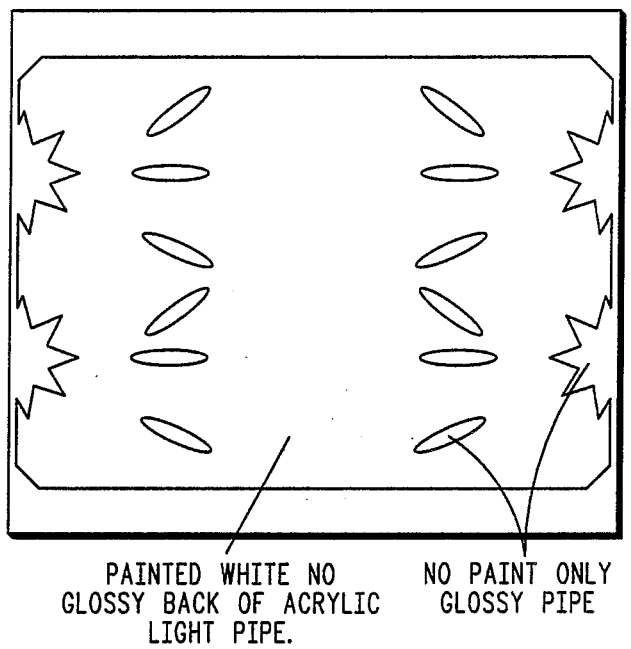
FIG. 4 shows the preferred embodiment of a pattern for painting the bottom of the light pipe in accordance with the present invention.

The light pipe (101) must be appropriately constructed for proper operation of this invention. All sides, the top and the non-pained area of the back must be smooth, allowing internal reflection of light to occur. The black of the light pipe (101), is selectively painted white. A pattern in the form of a border, half-sun and ovals around each lamp is left unpainted. The preferred embodiment of such a pattern is illustrated in FIG. 4. The smooth unpainted surfaces of the light pipe internally reflect light that has an angle of incidence less than the critical angle, 42° for acrylic. The angle of reflection equal the angle of incidence. The white paint provide diffuse reflection, scattering the light. Some of this light escapes the light pipe and passes through the LCD. The border, ovals and half-sun pattern, therefore, has the effect of dimming the hot spots caused by the proximity of the lamps, and increasing the brightness in the painted area.

The inside radius of the light pipe (101) near each lamp (301-304) follows the outside radius of the lamps' (301-304) lenses. This allows the light leaving the lamps' (301-304) lens to enter the light pipe (101) without refracting. A straigth path for the light leaving the lamp (301-304) and entering the light pipe (101) improves the evenness of the illumination in the light pipe (101) near each lamp (301-304).

Figure 5:
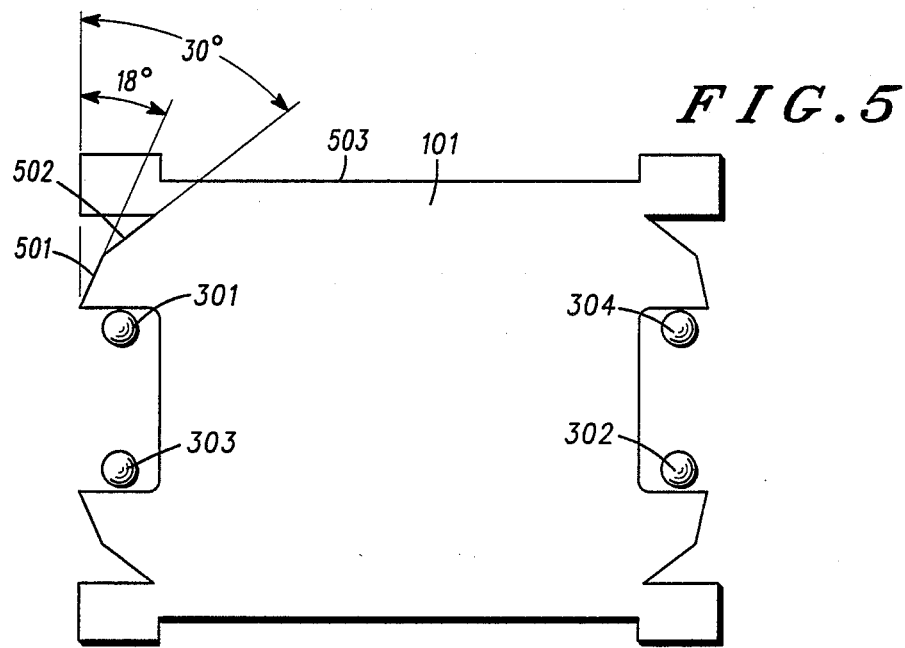
FIG. 5 shows the configuration of the preferred embodiment of the light pipe in accordance with the present invention.

The corners of the light pipe (101) near each lamp are angled as shown in FIG. 5. A significant portion of the lamps output exits from the end of the lamp. This light would not be captured, and therefore wasted, if a simple rectangular light pipe were used. The angled surfaces (501-502) reflect, this light onto surface (503) of the light pipe. The path of the light reflecting off surfaces (501,502,503) is easily plotted using a graphical method. Using such a method, the angles have been determined so that this light is directed toward the center area of the light pipe, which would otherwise be dim. In the preferred embodiment, the first surface (501) is angled 18° from the side and the second surface (502) is angled 30° from the side. Any light striking the angled surfaces (501-502) or side (503) that exceeds the critical angle will be refracted outside the light pipe (101).

Light that is refracted outside the light pipe (101) is reflected back into it by the two white elastomeric connecting strips (104) and the two white diffusing reflectors (103). The positioning of these reflectors (103) and connectors (104) is illustrated in FIG. 1. The elastomeric connecting strips (104) also have the purpose of connecting the LCD driving circuitry to the LCD.

The top surface of the backlighting apparatus should not be positioned in direct contact with any other surface. An air gap should be maintained to preserve the internal reflection properties of the light pipe (101). A colored filter between the LCD and the light pipe (101), a typical negative image LCD application, will not degrade the operation as there is only intermittent contact between the light pipe (101) and the filter. Only a few molecules of air above the light pipe (101) are required for proper operation of this invention.

The backlighting apparatus can evenly light both negative and positive image LCDs. The combined improvement in optical efficiency from all aspects of this invention requires less illumination to achieve a given brightness. As incandescent lamp efficiency is inversely related to its operating life, either an increase in lifetime, a decrease in power consumption and heat, an increase in overall brightness or some combination of these advantages is achieved by this invention.

The light pipe, with angled corners to direct light toward the middle of the display, provides even lighting throughout the display with not hot spots. Using the backlighting apparatus, a negative image LCD can attain the appearance of an LED display and be readable under all lighting conditions, but at a lower cost than an LED display.

An alternate embodiment of this invention is to use other light sources such as LEDs. Different numbers of light sources could be used depending on the size of the display and brightness required. The angles and size of surfaces (501,502) as well as the selective pattern illustrated in FIG. 4 would be optimized for the emission pattern of the light source. The back side of the light pipe could be treated in any manner that produces diffuse reflection. The light pipe could be any material that provides internal reflection principles. The material around the light sources could be any material that provides reflection.

Those skilled in the art will recognize that various modifications and changes could be made to the invention without departing from the spirit and scope thereof. It should therefore be understood that the claims are not to be considered as being limited to the precise embodiments set forth in the absence of specific limitations directed to such embodiments.

We claim:

1. Apparatus for backlighting a liquid crystal display, comprising:
   (a) substantially transparent means for distributing light having sides, a top, and a bottom, at least one side of the sides having at least one recess;
   (b) at least one light source, positioned in the at least one recess, for providing the light;
   (c) first reflecting means for changing a path of the light exiting at least one side of the means for distributing light;
   (d) second reflecting means, positioned in at least one plane around the at least one light source, for reflecting the light;
   (e) a diffuse reflecting material disposed upon the bottom of the means for distributing light; and
   (f) a segment of the at least one side, between the at least one recess and a corner of the transparent means for distributing light, having a plurality of angles for reflecting the light.

2. The apparatus of claim 1 wherein the at least one light source is an incandescent light bulb.

3. The apparatus of claim 1 wherein the means for distributing light is a flat light pipe comprised of a substantially transparent material.

4. The apparatus of claim 3 wherein the substantially transparent material is an acrylic material.

5. The apparatus of claim 1 wherein the top, a selective part of the bottom, and the sides of the means for distributing light are smooth.

6. The apparatus of claim 1 wherein the diffuse reflecting material disposed upon the bottom of the means for distribution light is white paint.

7. The apparatus of claim 1 wherein the diffuse reflective material is disposed such that the at least one light source provide evenly distributing light.

8. Apparatus for backlighting a liquid crystal display, comprising:
   (a) substantially transparent means for distributing light having sides, a top, and a bottom, at least one side of the sides having at least one recess; p1 (b) at least one light source, positioned in the at least one recess, for providing the light;
   (c) a diffuse reflecting material disposed upon the bottom of the means for distributing light; and
   (d) a segment of the at least one side, between the at least one recess and a corner of the transparent means for distributing light, having a plurality of angles for reflecting the light.

9. The apparatus of claim 8 wherein the at least one light source is an incandescent light bulb.

10. The apparatus of claim 8 wherein the means for distributing light is a flat light pipe comprised of a substantially transparent material.

11. The apparatus of claim 10 wherein the substantially transparent material is an acrylic material.

12. The apparatus of claim 8 wherein the top, a selective part of the bottom, and the side of the means for distributing light are smooth.

13. The apparatus of claim 8 wherein the diffuse reflecting material disposed upon the bottom of the means for distributing light is white paint.

14. Apparatus for backlighting a liquid crystal display, comprising:
   (a) a flat, substantially transparent means for distributing light, having four sides, wherein a first and a second opposing side each have a recess, each recess having at least one light source positioned therein for providing the light, the first and second opposing sides each having a plurality of angles between a corner of the means for distributing light and the recess, wherein light emitted from a light source of the at least one light source is reflected off the plurality of angles to substantially evenly distribute the light within the means for distributing light;
   (b) a first reflecting surface positioned on a third side of the means for distributing light and a second reflecting surface positioned on a fourth side of the means for distributing light, such that the light exiting the third and fourth sides is reflected into the means for distributing light;
   (c) a third reflecting surface, for reflecting the light, positioned in at least one plane around the at least one light source on the first opposing side;
   (d) a fourth reflecting surface, for reflecting the light, positioned in at least one plane around the at least one light source on the second opposing side; and
   (e) a diffuse reflecting material disposed on a bottom of the light pipe for diffusing light striking the bottom of the light pipe, the reflecting material disposed in such a manner as to substantially evenly distribute the light from the at least one light source.

15. The apparatus of claim 14 wherein the at least one light source is at least one incandescent light bulb.

16. The apparatus of claim 14 wherein the means for distributing light is a flat light pipe comprised of a substantially transparent material.

17. The apparatus of claim 16 wherein the substantially transparent material is an acrylic material.

18. The apparatus of claim 14 wherein the top, a selective part of the bottom, and the sides of the means for distributing light are smooth.

19. A communication apparatus, the apparatus comprising:
   (a) transmitting means:
   (b) receiving means; and
   (c) a liquid crystal display (LCD) module for displaying data, the module comprising:
   an LCD; and
   an LCD backlighting apparatus, comprising:
      substantially transparent means for distributing light having sides, a top, and a bottom, at least one side of the sides having at least one recess;
      at least one light source, positioned in the at least one recess, for providing the light;
      a diffuse reflecting material disposed upon the bottom of the means for distributing light; and
      a segment of the at least one side, between the at least one recess and a corner of the transparent means for distributing light, having a plurality of angles for reflecting the light.

* * * * *